United States Patent [19]
Bigliani et al.

[11] 4,121,556
[45] Oct. 24, 1978

[54] SPARK ADVANCE SYSTEM FOR INTERNAL COMBUSTION ENGINES COMPRISING A DEVICE FOR CONTROLLING THE CHARGE CURRENT IN THE IGNITION COIL IN CONNECTION WITH SIGNIFICANT PARAMETERS

[75] Inventors: Umberto Bigliani, Collegno (Turin); Mauro Maioglio, Turin, both of Italy

[73] Assignee: Fabbrica Italiana Magneti Marelli, S.p.A., Milan, Italy

[21] Appl. No.: 662,353

[22] Filed: Mar. 1, 1976

[30] Foreign Application Priority Data

May 13, 1975 [IT] Italy .............................. 23259 A/75
Jul. 4, 1975 [IT] Italy .............................. 25084 A/75

[51] Int. Cl.² ........................... F02P 5/04; F02P 5/00
[52] U.S. Cl. ................................................ 123/148 E
[58] Field of Search .................... 123/148 E

[56] References Cited

U.S. PATENT DOCUMENTS

| 3,952,715 | 4/1976 | Van Siclen, Jr. ............... 123/148 E |
| 3,955,723 | 5/1976 | Richards ......................... 123/148 E |
| 3,989,024 | 11/1976 | Sun Lai et al. ................. 123/148 E |
| 3,991,730 | 11/1976 | Crall ............................... 123/148 E |

Primary Examiner—Samuel W. Engle
Assistant Examiner—Thomas H. Webb
Attorney, Agent, or Firm—Ostrolenk, Faber, Gerb & Soffen

[57] ABSTRACT

A solid state ignition system for an internal combustion engine is controlled by a spark advance means in relation to one or more parameters affecting spark quality. Supply battery voltage is monitored by the spark advance means whereby the latter generates control signals that regulate primary ignition current so that the latter attains a predetermined level before primary ignition current is interrupted.

12 Claims, 8 Drawing Figures

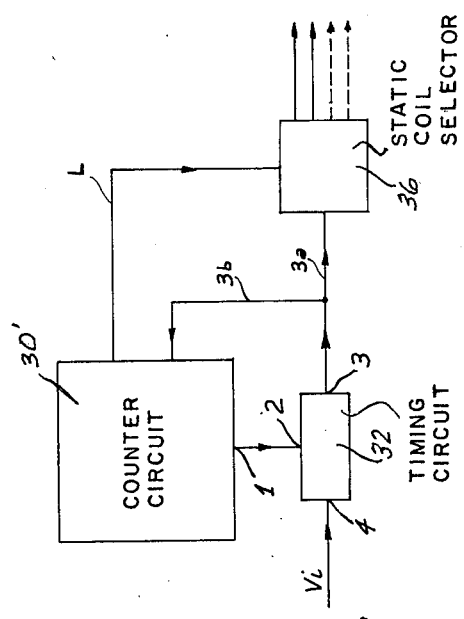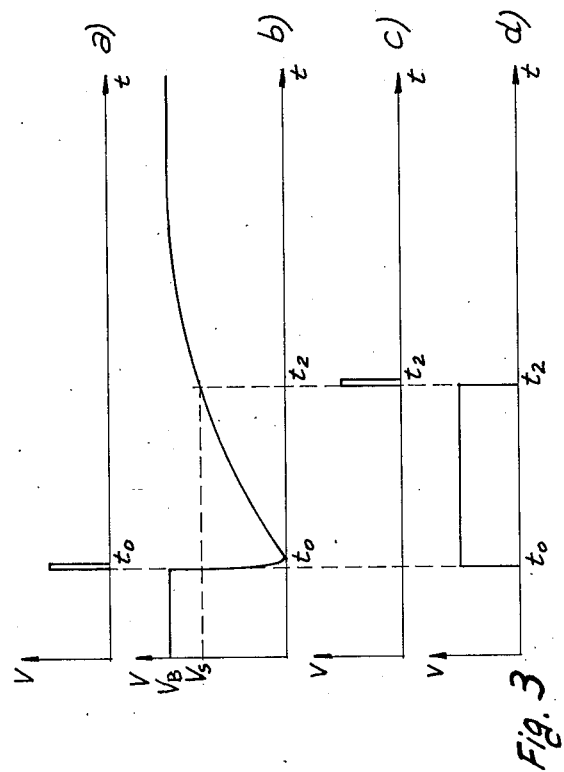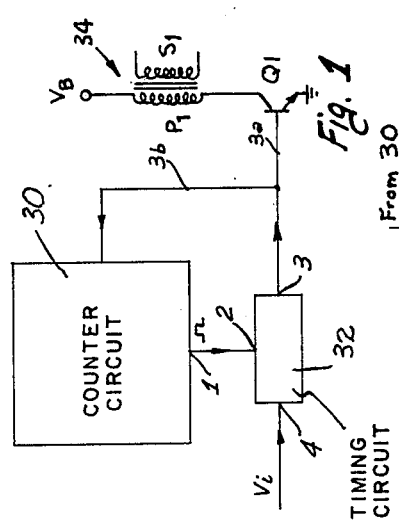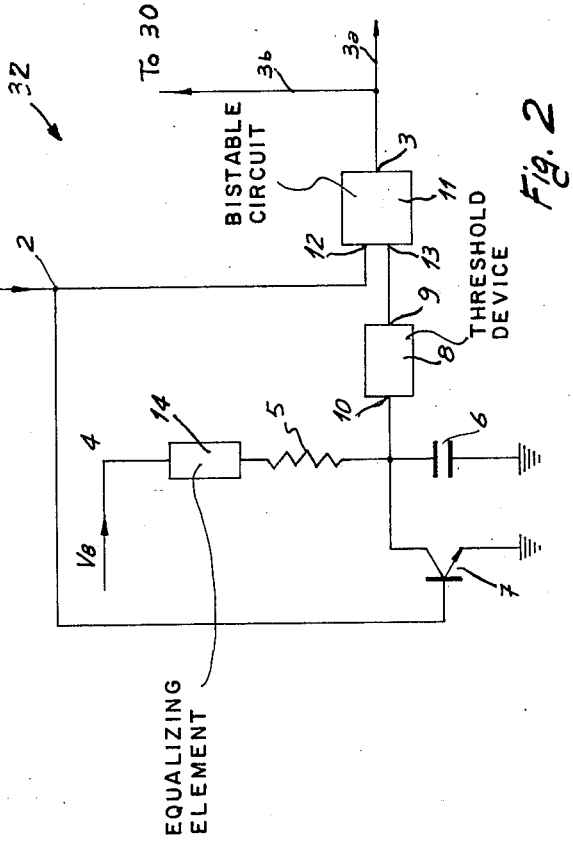

SPARK ADVANCE SYSTEM FOR INTERNAL COMBUSTION ENGINES COMPRISING A DEVICE FOR CONTROLLING THE CHARGE CURRENT IN THE IGNITION COIL IN CONNECTION WITH SIGNIFICANT PARAMETERS

This invention relates to an ignition advance system for internal combustion engines. More particularly, this invention relates to an ignition advance system which varies the charge time of a starter coil as a function of the parameters effecting coil charge.

In the Italian Patent Application No. 25290 A/74, filed on July 18, 1974 in the name of the inventor of the present invention, a spark advance system is shown and described. The system of the foregoing Application supplies a current to the primary winding of a starting coil for a predetermined time; at the expiration of which there is a discharge to the secondary winding of the starting coil causing a spark to be applied to the spark plug. In such a system, the initiation of current supply to the primary winding should precede the discharge of secondary coil by a sufficient time for the coil current to attain the predetermined charge magnitude just prior to coil discharge.

In the foregoing application the control device is provided by a monostable multivibrator controlling the coil supply, by acting on a transistor connected in series to the primary winding of the coil, for a time corresponding to its operating period.

In the foregoing device, the supply time for the starting coil primary winding is constant and does not take into account any possible variations in the parameters effecting the coil charge. Thus, for example, as a voltage drop occurs, the coil charge current does not attain the predetermined charge magnitude of the expiration of the constant time. Defined by the multivibrator and, as a result, the coil discharge may be weak resulting in efficient ignition.

It is the main object of the present invention to provide a spark advance system comprising a device for controlling the coil charge current, enabling the coil to charge always at a predetermined constant value (1/2 $LI_n^2$) maintaining the predetermined ignition timing. Thus, the advantage is provided that also as those parameters vary, that is the parameters affecting the coil charge (battery voltage, coil temperature, electrical coil characteristics, etc.), the charge energy is constant, whereby an efficient discharge is always ensured.

Therefore, the spark advance system of the present invention varies the charge time of the starter coil to assure that the starter coil attains a predetermined charge magnitude, preferably 1/2 $LI_n^2$. This goal is achieved by varying the charge time as a function of both the battery voltage and speed of the engine.

Where the involved parameter is the battery voltage, according to a simple embodiment the detecting means for the coil charge current comprises:
(a) an RC charging circuit wherein the capacitive means are supplied from the battery voltage and having a time constant period corresponding to that required of the ignition coil;
(b) a discharge circuit for the capacitive means, comprising an electronic switch operatively driven by a pulse generated by an appropriate counter circuit.

In the foregoing embodiment, since the charge time constant RC charging circuit equals that of the ignition coil charging circuit, the charge current must attained the predetermined value at the time the coil supply is cut off and the secondary coil is allowed to discharge.

The charge power for the primary winding of the coil is constant and independent of the battery voltage; as a result, the electric discharge has steady and time repeatable characteristics, and the coil and switch (transistor) series connected to its primary winding are advantageously dimensioned for only one current rate, not having to take into account any variations in the battery voltage.

It is a further object of the present invention to provide a spark advance system comprising the above mentioned control device, in which high voltage distribution statically occurs.

Therefore, the present invention also relates to an electronic ignition advance system, wherein the control device selectively drives the primary winding supply for a plurality of ignition coils by means of a static coil selector controlled by a device for generating signals indicative of the top dead centers forming part of the spark advance apparatus, providing thereto distinguished signals for the different top dead centers, so as to allow a selective supply of the coils.

The advantages and features of the ignition advance system according to the invention will now become more apparent from the following description and accompanying drawings relating by mere way of unrestrictive example to some preferred embodiments of the invention.

In the drawings:

FIG. 1 is a quite general block diagram of the spark advance system with the device for controlling the ignition coil charge, in accordance with the invention;

FIG. 2 is a block diagram of an embodiment for the control device shown in FIG. 1;

FIG. 2A is a modification of FIG. 2;

FIG. 3 shows the waveforms relating to the operation of the device shown in FIG. 2;

FIG. 4 is a view showing the diagram of FIG. 1 with a coil selector for providing the static distribution of high voltage;

Figures 2A, 5:
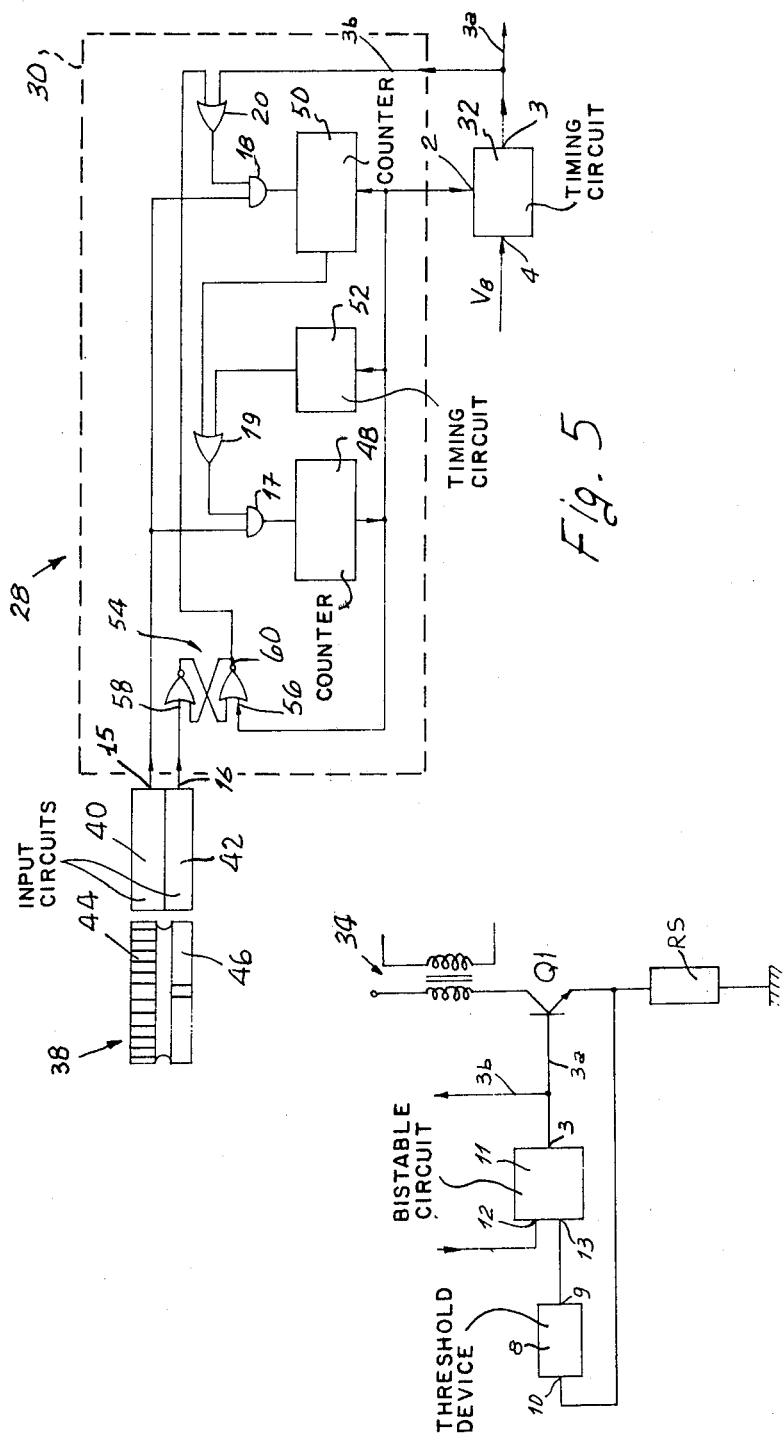
FIG. 2a is a block diagram of another embodiment for the counter apparatus.
FIG. 5 is a block diagram of an exemplary spark advance apparatus driving the control device.

Referring now to FIG. 1, an ignition advance system 28 comprises a counter circuit 30 and a timing circuit 32. As will be shown in greater detail below, counter circuit 30 initiates the charging period of primary coil P1 of starter coil 34 while timing circuit 32 controls the duration thereof.

Counter circuit 30 generates a start pulse at its output 1 whenever a new charging cycle of starter coil 34 is to be initiated. This pulse is applied to input 2 of control circuit 32 which also received a signal $Vi$ at its input 4. Signal $Vi$ is indicative of one or several significant parameters such as, for example, battery voltage, coil temperature, etc. Timing circuit 32 is responsive to this signal and varies the charging time of coil 34 as a function of signal Vi. Particularly, timing circuit 32 adjusts the charging time of coil 34 so that at the end of the charging the current coil has attained the preset charge rate.

The counter circuit 30 may be of any design, on the condition of being capable of supplying timing circuit 32 with a start pulse for initiating charging of the primary coil 34 and being able to vary the instant for supplying said start pulse so as to retain the present ignition timing.

In the embodiment of FIG. 2, the control circuit substantially comprises a RC charge circuit including at least a resistor 5 and a capacitor 6; a discharge circuit for capacitor 6 including a transistor 7 which is enabled by the start signal provided by the spark advance apparatus to the device input 2. A threshold device 8 generates a pulse at its output 9 when the charge voltage for capacitor 6, as applied to input 10 of device 8, attains a preset threshold voltage. A bistable circuit 11 having one input 12 connected to the timing circuit input 2 and its other input 13 connected to the output 9 of threshold device 8.

An equalizing element 14 which compensates for the voltage drop in the electronic switch (transister 21) in series with the primary winding of the coil can be connected in the RC charge circuit. Such an element may comprise one or several series connected diodes, or a Zener diode, etc.

The operation of the device of FIG. 2 will now be described, assuming that signal applied to its input 4 is the battery voltage $V_B$.

At the instant $t_o$ that the start signal from the spark advance apparatus arrives at input 2 (FIG. 3a), both capacitor 6 is discharged through transistor 7 (FIG. 3b), and bistable circuit 11 is switched at this instant $t_o$ passing from logical level 0 to logical level 1 (FIG. 3d).

Thus, from instant $t_o$, a signal appears at output 3 of said bistable circuit 11 turning on transistor 21 (see FIG. 1) and increasing the count in counter circuit through lines 3a and 3b, respectively.

Following time $t_o$, due to the absence of a start signal at input 2, transistor 7 is cut off and capacitor 6 is permitted to charge through resister 5. At time $t_2$ (FIG. 3b) the charge across capacitor 6 reaches a value $V_s$ equal to the threshold value of device 8, causing threshold device 8 to provide an output pulse (FIG. 3c) driving the output of bistable circuit 11 from level 1 to level 0, so that no signal appears at output 3 of bistable circuit 11 at time $t_2$ (FIG. 3d). Of course, should voltage $V_B$ vary, the time required for voltage of capacitor 6 to attain threshold value $V_s$ would vary, and accordingly time $t_o-t_2$ (FIG. 3d) would vary.

According to the embodiment shown in FIG. 2A, a signal can be picked off across a resistor RS series connected to the primary winding of the coil K and applied to input 10 of threshold device 8. In such a case, the device of FIG. 2 would be considerably simplified because of the omission of both the charge circuit 5,6 and discharge circuit 6,7 of capacitor 6.

In the embodiment of FIG. 4, the output signal of control circuit 32 selectively drives the supply for a plurality of ignition coils by means of a static coil selector 36 to provide a static distribution of high voltage.

Of course, this selector 36 can correctly select supply for the several coils if suitably controlled by counter circuit 30'. To this end, such an apparatus additionally comprises over counter circuit 30 of FIG. 1 a device for specifying or locating the top dead centers of each of a plurality of spark plugs such that circuits 30' is capable of providing the coil selector with the distinguishing signals through line 7 for the different top dead centers.

In order that the ignition advance system according to the invention be more clearly understood, the device as connected for controlling the coil charge current will now be described by way of example when connected in the electronic spark advance apparatus shown in FIGS. 5 and 7.

Furthermore, the control circuit 32 is assumed to correspond to the embodiment of FIG. 2.

Referring to FIG. 5, a gear wheel 38 is shown as being rotably driven by the engine shaft. Circuits 40 and 42 are two input circuits of the ignition advance system 28 and coupled with gear wheel 38. Gear wheel 38 has two sets of teeth, the first set 44 comprising a plurality of teeth and the second set 46 at least one tooth.

The first input circuit 40 is coupled through sensor means to the tooth set 44 to provide at output 15 a series of position pulses having a frequency depending on the rotational speed of gear wheel 38. Similarly, the second input circuit 42 is coupled through sensor means to the tooth set 46 to provide at output 16 reference pulses at the top dead, also having a frequency depending on the rotational speed of gear wheel 38.

Output 15 of circuit 40 is connected to both a first counter 48 and a second counter 50 through respective AND gates 17 and 18. Initially, counters 48 and 50 count the pulses at output 15 of first input cicuit 40 for a time period defined by respective timing circuits 52 and 32.

Particularly, the first timing circuit 52 sets the count time for counter 48 enabling AND gate 17 by means of OR gate 19, and the second timing circuit 32 sets the count time for counter 50 enabling AND gate 18 by means of OR gate 20 connected to its output 3 by means of line 3b.

Additionally, timing circuit 32 is connected at output 3 through line 3a to an electronic switch (not shown) controlling the supply to the primary winding of an ignition coil.

Output 16 of second input circuit 42 is connected to said second counter 50 through a bistable circuit 54 OR gate 20 and AND gate 18. In turn, counter 50 is connected to counter 48 through OR gate 19 and AND gate 17.

Finally, the output of counter 48 is connected to the first and second timing circuits 52 and 32, the second counter 50 and input 56 of to said bistable circuit 54. The other input 56 of bistable circuit BS is connected to output 16.

Figure 6:
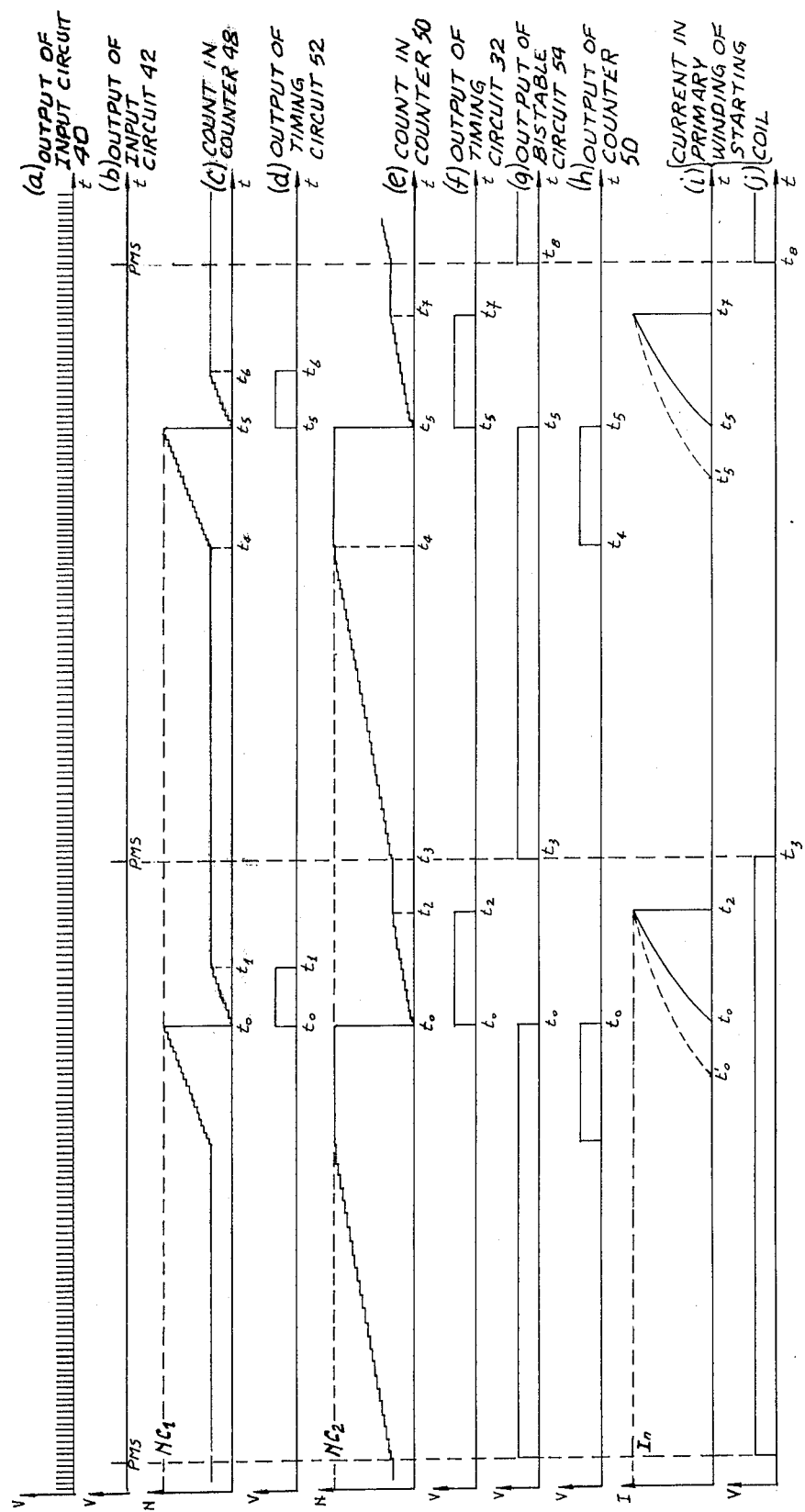
FIG. 6 shows the waveforms for some signals of the apparatus shown in FIG. 5, assuming a constant speed of the internal combustion engine and a determined battery voltage.

Referring to FIG. 6, the operation of the ignition advance system of FIG. 5, wherein timing circuit 32 correspond to the control circuit 32 shown in FIG. 2, is as follows.

As gear wheel 38 rotates, pulse signals appear at the output 15 of first input circuit 40, as shown in FIG. 6a, while pulse signals appear at output 16 of second input circuit 42 only at the top dead centers, as shown in FIG. 6b.

As apparent, circuits 40 and 42 would include sensor means coupled to the teeth 44, 46 on gear wheel 38 and wave forming means capable of converting the signals from the sensor into pulse signals.

It is also apparent that detection of top dead centers could be provided by suitably selecting the number of teeth 46 and/or by suitably selecting and arranging the number of sensors in circuit 42.

From time $t_o$, which is assumed to be the resetting instant for counter 48, both counter 48 (FIG. 6c) and counter 50 (FIG. 6e) start to count the pulses at output 15.

Counting by counter 48 lasts for time interval $t_o-t_1$ (FIG. 6d), as defined by the output of first timing circuit $CT_1$, and counting by counter 50 lasts for time interval $t_o-t_2$ (FIGS. 3d and 6f), as defined by the output of second timing circuit 32 responsive to voltage $V_B$.

Time interval $t_o-t_2$ varies in an inverse ratio relative to battery voltage $V_B$, so that at the end $t_2$ of such a time interval the current in the primary winding of the coil, which starts to flow at time $t_o$, has attained the preset charge rate $I_n$ (FIG. 6i). At this instant $t_2$, timing circuit 32 controls cut off of the primary winding supply and the secondary winding of the coil is discharged, with a resulting spark to the spark plug.

At times $t_1$ and $t_2$, AND gates 17 and 18, respectively, are disabled causing counters 48 and 50 to stop is counting (see horizontal lines of FIGS. 6c and 6e corresponding to periods $t_1-t_4$ and $t_2-t_3$, respectively). At time $t_3$, the first signal of top dead center (PMS) is received at output 16 (FIG. 6b), and bistable circuit 54 supplies a signal at output 60 (FIG. 6g), enabling AND gate 18 through OR gate 20, so that counter 50 can resume counting. This counting continues until the number of counted pulses attains a predetermined number $NC_2$ (FIG. 6e), which occurs at time $t_4$. At time $t_4$, counter 50 generates a signal (FIG. 6h) enabling AND gate 17 through OR gate 19, so that counter 48 can also resume counting. This counting continues until the number of counted pulses attains a predetermined number $NC_1$ (FIG. 6c), which occurs at time $t_5$.

At time $t_5$, counter 48 is reset, at the same time resetting counter 50, enabling the first and second timing circuits 52 and 32, and resetting said bistable circuit 54, thus starting a new cycle as described from.

For a different rate of battery voltage, time $t_o$ the instant at which the supply to the primary winding of the coil is initiated, will vary while the discharge instant $t_2$ remains constant, assuming that the engine speed or r.p.m. is constant.

Thus, for example, should the battery voltage decrease, the coil supply would start at instant $t_o'$ (FIG. 6i), preceding instant $t_o$, to allow the current flowing in the primary winding to attain the preset charge rate $I_n$ at discharge instant $t_2$. Of course, at this instant $t_o'$ counter 48 will be reset and the cycle will be initiated to terminate at instant $t_5'$ (FIG. 6i).

So far, the speed of the internal combustion engine has been assumed to be constant to point out that the control or timing circuit 32 does not vary the coil discharge instant $t_2$. In reality, the engine speed is variable and the counter circuit 30 takes this into account to vary the coil discharge instant $t_2$ in accordance with a determined advance law, but without affecting the coil charge times, which are exclusively defined by timing circuit 32 in dependence on the supply voltage.

Figure 7:
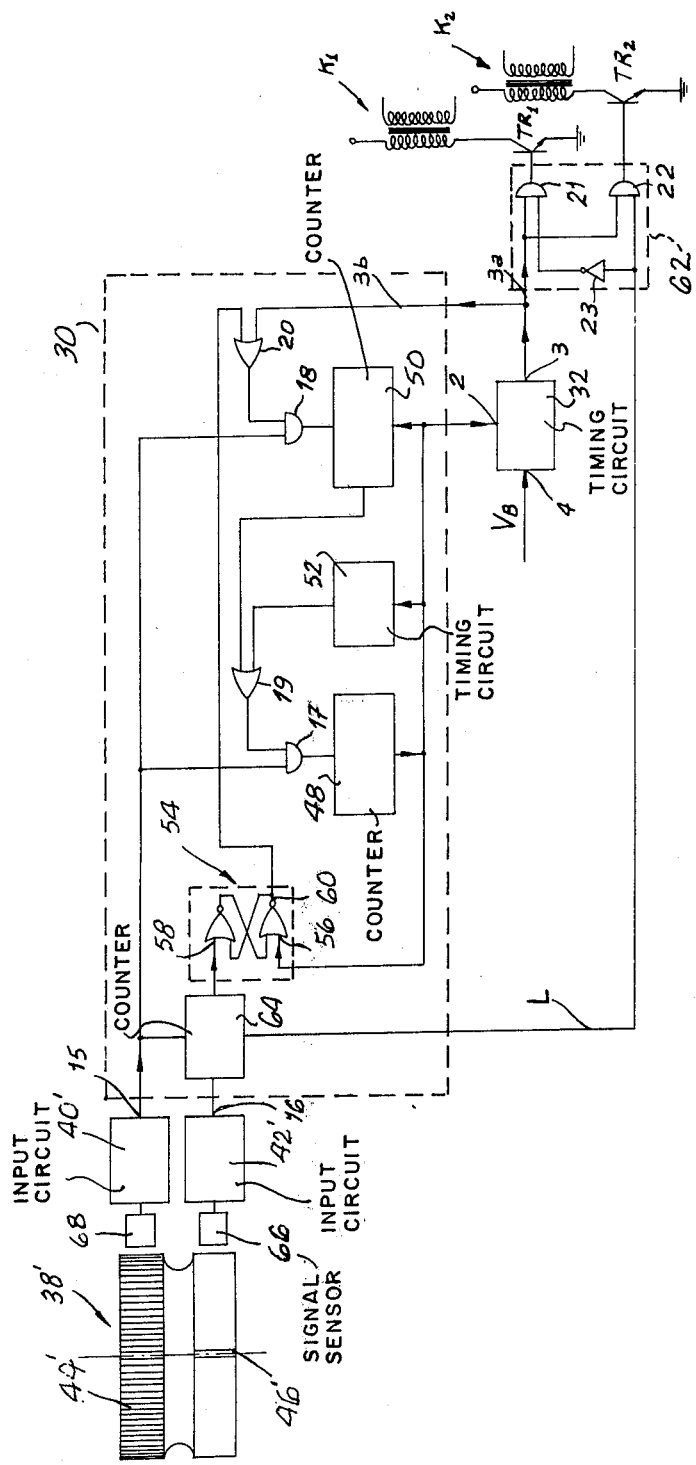
FIG. 7 is a view of the apparatus shown in FIG. 5, as completed with means for providing through a coil selector the static distribution of high voltage for two ignition coils.

FIG. 7 still shows the ignition advance system of FIG. 5, but wherein a plurality of coils $K_1$, $K_2$ are provided and the signal supplied from timing circuit 32 to the various coils is statically distributed.

Generally, to this end, a coil selector circuit 62 is connected between output 3 of timing circuit 32 and the electronic switches (transistors $TR_1$, $TR_2$) controlling energization of the primary windings of the coils $K_1$, $K_2$. Coil selector circuit 62 is controlled by a counter 64 which specifies and locates the top dead centers.

Counter 64 connected between output 16 of second input circuit 42 and bistable circuit 54, and capable of supplying the latter with a pulse at each of top dead centers and coil selector 62 with distinguishing signals for the different top dead centers, so that the supply of a certain coil would correspond to each signal of a determined top dead center.

In addition to specifying the signals, should counter 64 also perform a function of multiplying the signals of top dead centers, such a device would be also connected to output 15 of the first input circuit $A_2$ to count the pulses supplied by this circuit $A_2$.

Thus, particularly in an engine using two ignition coils $K_1$ and $K_2$, as shown in FIG. 7, the teeth of gear wheel 44' cooperating with the single sensor 66 of input circuit 42, could be reduced to only one tooth 46', and in such a case counter 64 would operate as a top dead center signal doubler, so as to transmit a first signal through line L to coil selector 62 as tooth 46' passes in front of sensor 66 and a second different signal after rotation of gear wheel 38; by 180°, which rotation is checked from counting by device 64 of the pulses corresponding to half teeth 44'. Therefore, it is apparent that counter 64 successively supplies bistable circuit 54 with two signals of top dead center, one of which is real and the other imaginary.

FIG. 7 also shows a preferred simple embodiment of coil selecting circuit 62 in case of an engine having two coils $K_1$ and $K_2$ and FIG. 61 shows the pattern for the drive signal transmitted from counter 64 to selector 62.

Selector 62 comprises two AND gates 21 and 22, the outputs of which respectively drive the control transistors $TR_1$ and $TR_2$ for the primary windings of the two coils $K_1$ and $K_2$, whereas one input of each of the gates is connected to output 3 of timing circuit 32 and the other input of each gate is connected to the output of device 64, one directly and the other through an inverter 23.

In operation, counter 64 drives coil selector 62 by supplying through line L two signals of a different level, for example level 1 to enable AND gate 22, thereby allowing the primary winding of coil $K_2$ to be supplied, and level 0 for enabling AND gate 21, thereby allowing the primary winding of coil $K_1$ to be supplied. Obviously, the level signal at each of top dead centers PMS would change (see $t_3$ and $t_8$ of FIG. 61).

The above mentioned counters 48, 50 and 64 are conventional counters, for example counters RCA 4024 can be used.

Timing circuit 52 is also a per se known circuit and can be a standard monostable multivibrator.

What is claimed is:

1. An ignition timing system for use in an internal combustion engine of the type having in combination a cylinder, a piston and a spark plug, said system comprising:
   (1) charge storage means for storing electrical energy and for discharging said electrical energy across the spark gap of said spark plug;
   (2) ignition control means for serially charging and discharging said charge storage means so as to serially ignite said spark plug, said ignition control means to;
      (a) discharge said charge storage means at instants determined by the speed of the engine; and
      (b) charge said charge storage means for periods which vary in length as an inverse function of the magnitude of a power source supplying charge to said charge storage means such that said charge storage means charges to a constant, predetermined value just prior to each said discharge instant irrespective of variations in the magnitude of said power source.

2. The ignition system of claim 1 wherein said ignition control means comprises an electronic switch, a timing circuit and a counter circuit;
(1) said electronic switch operable in a first and second state, said electronic switch being adapted to cause said power source to apply charge to said charge storage means when said electronic switch is in said first state and to cause said charge storage means to discharge when said electronic switch is in said second state;
(2) said timing circuit for placing said electronic switch in said first state at the beginning of each said charging period and for placing said electronic switch in said second state at the end of each said charging period, said timing circuit to determine the length of each said charging period as an inverse function of the magnitude of said power supply;
(3) said counter circuit for causing said timing circuit to initiate each said charging period at an instant which varies as a function of engine speed and the magnitude of said power supply such that said timing circuit terminates each said charging period, and thereby causes said charge storage means to discharge, at an instant which is a function of engine speed but independent of the magnitude of said power source.

3. The ignition system of claim 2 wherein said timing circuit includes second charge storage means supplied by said power supply for generating a reference signal indicative of the amount of charge stored by the first said charge storage means.

4. The ignition system of claim 3 wherein said second charge storage means comprises an RC network having a time constant proportional to that of said first charge storage means.

5. The ignition system of claim 3 wherein said counter circuit generates a start signal which determines the instant at which each said charging period is to start and wherein said timing circuit comprises:
means for generating a stop signal when said reference signal indicates that said first storage means has charged to said predetermined value; and
a bistable circuit which is set by said start signal and reset by said stop signal and whose output controls the operation of said electronic switch.

6. Apparatus comprising:
(1) an internal combustion engine including N combustion chamber means, N being a positive integer greater than 1, each said combustion chamber means comprising a cylinder, a piston and a spark plug;
(2) N charge storage means, each of said charge storage means being associated with a different one of said combustion chamber means, each said charge storage means being adapted to both store electrical energy and to discharge electrical energy across the spark gap of its associated spark plug;
(3) ignition control means for serially charging and discharging each of said charge storage means so as to serially ignite each of said spark plugs, each of said charge storage means being discharged by said ignition control means at instants determined by the speed of the engine said charge storage means also being charged by said ignition control means for periods which vary in length as an inverse function of the magnitude of a power source supplying charge to each of said charge storage means such that each of said charge means charges to a constant, predetermined value just prior to each of its respective discharge instants irrespective of variations in the magnitude of said power source, said ignition control means comprising:
(a) N electronic switches each operable in a first and a second state, each of said electronic switches being associated with a different one of said charge storage means, each said electronic switch being adapted to cause said power source to apply charge to its associated charge storage means when the electronic switch is in said first state and to cause its associated charge storage means to discharge when the electronic switch is in said second state;
(b) a timing circuit, including logic control means, for sequentially placing each of said electronic switches in said first state at the beginning of the charging period of its associated charge storage means and for placing each of said electronic switches in said second state at the end of the charging period of its associated charge storage means, said timing circuit being adapted to determine the length of each said charging period of each of said charge storage means as an inverse function of the magnitude of said power supply;
(c) a counter circuit for causing said timing circuit to initiate the respective charging periods of each of said charge storage means at an instant which varies as a function of engine speed and the magnitude of said power supply such that the timing circuit terminates each said charging period, and thereby causes each said charge storage means to discharge, at an instant which is a function of engine speed but independent of the magnitude of said power source.

7. The ignition system of claim 2 wherein said counter circuit causes said timing circuit to initiate each said charging period at an instant which varies not only as a function of the speed of the engine and the magnitude of said power supply but also as a function of the position of the piston within the cylinder whereby said charge storage means is discharged at an instant which is a function of engine speed and the position of said piston within said cylinder but independent of the magnitude of said power source and wherein said counter circuit comprises:
means for generating speed pulses at a frequency proportional to the speed of said engine;
means for generating a position pulse each time said piston reaches its dead center position within said cylinder;
first counter means for counting speed pulses applied thereto and for generating said start pulse whenever the count in said counter reaches a second predetermined value;
second counter means for counting speed pulses applied thereto, said second counter means to reset whenever said start pulse is generated;
first gating means for applying said speed pulses to said second counter means during each of a plurality of first time periods defined by said charging periods and during each of a plurality of second time periods which begin when said position pulse is generated and end when said start pulse is generated;

second gating means for applying said speed pulses to said first counter means during each of a plurality of third time periods which begin at the beginning of each said charging period and end after a predetermined time delay and during each of a plurality of fourth time periods which begin when the count in said second counter means reaches a predetermined value and end when said first counter means generates said start pulse.

8. The ignition system of claim 7 wherein said timing circuit generates a first gating signal during each of said first timing periods and where said first gating means comprises:

a bistable circuit responsive to said position and start pulses for generating a second gating signal during each of said second time periods;

9. The ignition system of claim 8 wherein said third gating means comprises:

a first OR gate having a first input connected to said first gating signal and a second input connected to said second gating signal; and a first AND gate having a first input connected to said speed pulses and a second input connected to the output of said first OR gate, the output of said first AND gate being coupled to said second counter means.

10. The ignition system of claim 8 wherein said second counter means generates a third gating signal during each of said fourth time periods and wherein said second gating means comprises:

a second timing circuit for generating a fourth gating signal during each of said third time periods; and fourth gating means gated by said third and fourth gating signals for applying said speed pulses to said first counter means during each of said plurality of third and fourth time periods.

11. The ignition system of claim 10 wherein said fourth gating means comprises:

a second OR gate having a first input connected to said third gating signals and a second input connected to said fourth gating signal; and a second AND gate having a first input connected to said speed pulses and a second input connected to the output of said second AND gate being coupled to said first counter means.

12. The ignition system of claim 1 wherein said counter circuit causes said timing circuit to initiate each said charging period at an instant which varies not only as a function of the speed of the engine and the magnitude of said power supply but also as a function of the position of the piston within the cylinder whereby said storage means is discharged at an instant which is the function of engine speed and the position of said piston within said cylinder but independent of the magnitude of said power source.

* * * * *